(12) United States Patent
Lammers-Meis et al.

(10) Patent No.: US 6,819,549 B1
(45) Date of Patent: Nov. 16, 2004

(54) HINGED PROTECTIVE COVER FOR PORTABLE ELECTRONIC DEVICE

(75) Inventors: David Lammers-Meis, Prairie Village, KS (US); Christopher J. Hanshew, Lenexa, KS (US)

(73) Assignee: Garmin Ltd. (KY)

( * ) Notice: Subject to any disclaimer, the term of this patent is extended or adjusted under 35 U.S.C. 154(b) by 0 days.

(21) Appl. No.: 10/294,955

(22) Filed: Nov. 14, 2002

(51) Int. Cl.⁷ .................................................. G06F 1/16
(52) U.S. Cl. ...................................... 361/681; 361/683
(58) Field of Search ................................ 361/679–683, 361/686

(56) References Cited

U.S. PATENT DOCUMENTS

| | | | | |
|---|---|---|---|---|
| 5,555,157 A | * | 9/1996 | Moller et al. ................ | 361/683 |
| 6,108,200 A | | 8/2000 | Fullerton ..................... | 361/585 |
| 6,317,313 B1 | | 11/2001 | Mosgrove et al. .......... | 361/680 |
| D452,968 S | | 1/2002 | Eyers et al. ................. | D14/345 |
| 6,426,868 B1 | | 7/2002 | Fullerton ..................... | 361/680 |
| 6,460,221 B1 | | 10/2002 | Eromaki ....................... | 16/286 |
| 2002/0086702 A1 | | 7/2002 | Lai et al. ..................... | 455/556 |

* cited by examiner

Primary Examiner—Yean-Hsi Chang
(74) Attorney, Agent, or Firm—Devon A. Rolf

(57) ABSTRACT

Protective cover assemblies for portable electronic devices, e.g., Personal Digital Assistants (PDAs), are provided. The protective cover assemblies include a substantially planar cover portion and a flexible bridge member pivotally coupled with one another by a pair of brackets. The substantially planar cover portion is rotatable in a dual-pivot arrangement provided by the brackets with respect to the portable electronic device between an open position exposing a display screen, wherein the substantially planar cover portion lies adjacent a back surface of the portable electronic device, and a closed position wherein the display screen is covered and protected. The flexible bridge member may be coupled with the electronic device by engagement of a pair of posts within recesses on a surface of the electronic device. Such recesses are sized and shaped for receiving connection/alignment posts on a storage cradle or the like and are commonly found on electronic devices such as PDAs.

3 Claims, 3 Drawing Sheets

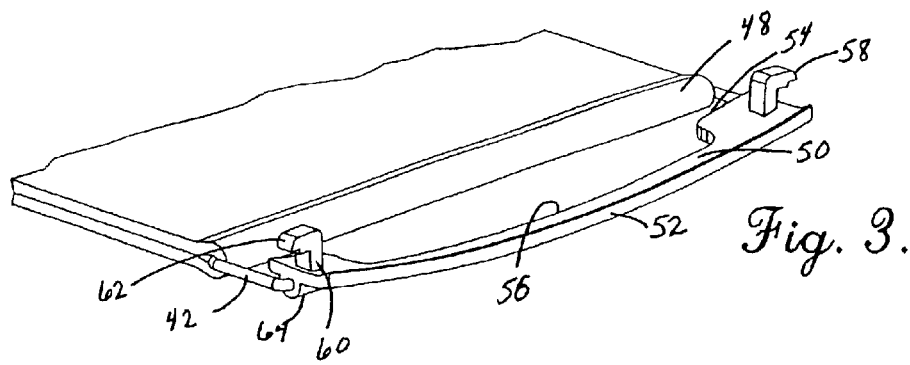
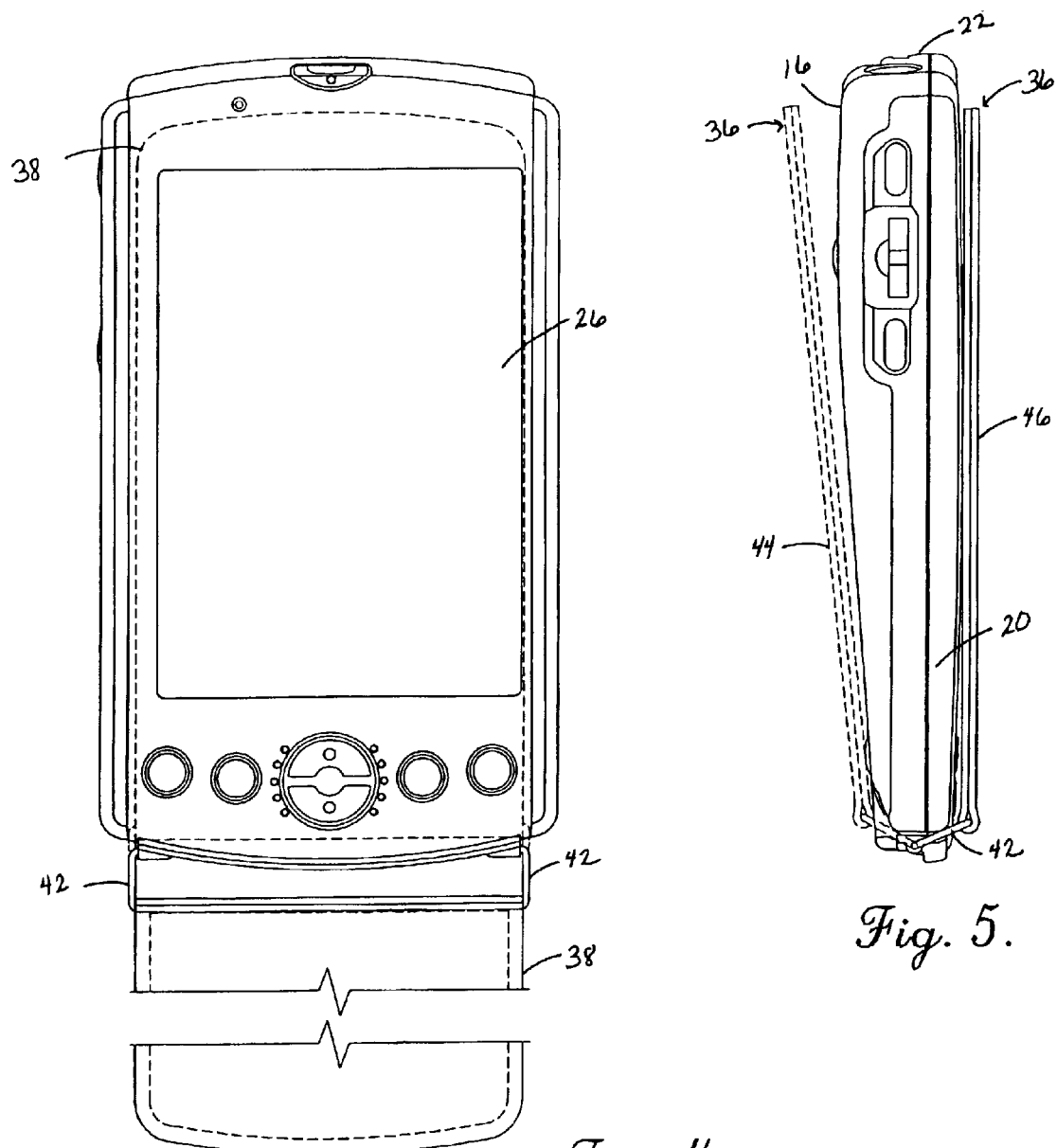
Fig. 3.
Fig. 4.
Fig. 5.

HINGED PROTECTIVE COVER FOR PORTABLE ELECTRONIC DEVICE

BACKGROUND OF THE INVENTION

1. Field of Invention

The present invention relates generally to covers for electronic devices. More specifically, the present invention relates to protective covers for portable electronic devices, such as Personal Digital Assistants (PDAs) and the like, which covers are rotatable between an open position exposing a display screen and/or one or more user controls and a closed position wherein the display screen and/or user controls are protected.

2. State of the Art

Portable computers which organize address books, daily planners, to-do lists, calendars and the like are ever increasing in popularity with nearly ten million of such computerized organizers being sold in recent years. Portable computerized organizers, or Personal Digital Assistants (PDAs) as they are commonly referred to, may be categorized into two major classifications: hand-held computers and palm-sized computers. Hand-held computers tend to be larger and heavier than their palm-sized counterparts. They tend to have larger display screens and use a miniature keyboard, typically in combination with touch-screen technology, for navigation and data entry. By contrast, palm-sized computers have smaller display screens and typically rely primarily on touch-screen technology for data entry, although voice and handwriting recognition programs are becoming increasingly prevalent.

Whatever the type of PDA, these portable computers share the same principal components which include, in part, a microprocessor, an operating system, memory, batteries, a display screen, a data input device, input/output ports and software. The software used by PDAs typically is desktop software as PDAs are designed to complement a desktop or laptop computer and make certain information stored therein, or otherwise available therefrom, portable for simplified user access.

The display screen of a PDA is typically a Liquid Crystal Display (LCD) screen. While PDAs vary in how a user inputs data, the display screens of PDAs are typically used not only for output, as in commonly available LCD screens for desktop and laptop computers, but also for input. Handheld computer PDAs typically use a miniature version of a standard keyboard in combination with a touch screen while palm-sized computers use a stylus or pen and touch screen technology almost exclusively (keeping in mind that voice and handwriting recognition programs may be used as well). Both hand-held and palm-sized computers also typically include at least a few user controls or buttons for accessing screens and applications.

As previously stated, the display screen of a PDA typically serves as both an input and an output device. The screen displays information with an LCD, not unlike those commonly available on laptop computers. Oriented over the surface of the LCD of a PDA, however, is a touch screen that permits the launch of programs, selection of various menu options and other data entry by touching the screen with a stylus or pen-like instrument. Alternatively, if the model employs handwriting recognition software, such functions may be initiated by writing data directly on the screen with the stylus.

Because PDAs are designed to be portable and are often placed inside of a pocket, purse, briefcase, or the like, the touch screens and corresponding keypads and/or buttons utilized for user input are vulnerable to damage. Particularly, the touch screens are vulnerable to scratching, rendering the information displayed on the LCD more difficult to read. As a result, carrying cases and other such protective devices for PDAs have become increasingly common. Such carrying cases, however, are often bulky and/or heavy and, as such, retract from the desirability and convenience of carrying such portable devices. Further, known carrying cases and other protective devices for PDAs are often suitable only for a particular type or brand of device. Consequently, a separate cover must be purchased or otherwise obtained for each different electronic device for which a cover is desired.

Thus, the inventors have recognized that a cover for a portable electronic device that is relatively light weight, has a low profile and is usable with a wide variety of existing electronic devices would be advantageous.

BRIEF SUMMARY OF THE INVENTION

The present invention provides protective cover assemblies for portable electronic devices, such as PDAs and the like. The protective cover assemblies include a substantially planar cover portion and a flexible bridge member pivotally coupled with one another about two spaced pivot points by a pair of brackets to provide spatially offset rotation of the substantially planar cover portion with respect to the flexible bridge member. The substantially planar cover portion is rotatable about the brackets between an open position exposing a display screen and/or one or more user controls, wherein the substantially planar cover portion may lie proximate a back surface of the portable electronic device, and a closed position wherein the display screen and/or user controls are covered and protected thereby.

The flexible bridge member may be coupled with the electronic device by engagement of a pair of posts within recesses on a surface of the housing of the electronic device. Such recesses are sized and shaped for receiving connection or alignment posts on a storage cradle or the like and are commonly found on electronic devices such as PDAs. Thus, the protective cover assemblies of the present invention may be utilized with a variety of existing electronic devices.

BRIEF DESCRIPTION OF THE DRAWINGS

The foregoing features and advantages of the invention will be apparent from the following description and apparent from the accompanying drawings, in which like reference characters refer to the same or similar parts throughout the different views. The drawings illustrate principles of the invention and, although not to scale, show relative dimensions.

FIG. 3 is a perspective view of a protective cover assembly according to the present invention showing a flexible bridge member and its attachment via brackets to a substantially planar cover portion;

FIG. 4 is an elevational view of a top surface of an electronic device showing the pivotal movement of a protective cover assembly according to the present invention between an open or exposed position and a closed or protective position;

FIG. 5 is a side elevational view of an electronic device having a protective cover assembly according to the present invention pivotally coupled therewith, wherein the substantially planar cover portion of the protective cover assembly is shown in solid line in its closed or protective position and in broken line in its open or exposed position;

DETAILED DESCRIPTION OF THE INVENTION

The present invention is directed to protective covers for portable electronic devices, which protective covers are rotatable between an open position exposing a display screen and/or one or more user controls and a closed position wherein the display screen and/or user controls are covered and protected. The particular embodiments described herein are intended in all respects to be illustrative rather than restrictive. Alternative embodiments will become apparent to those of ordinary skill in the art to which the present invention pertains without departing from its scope.

Figures 1, 2:
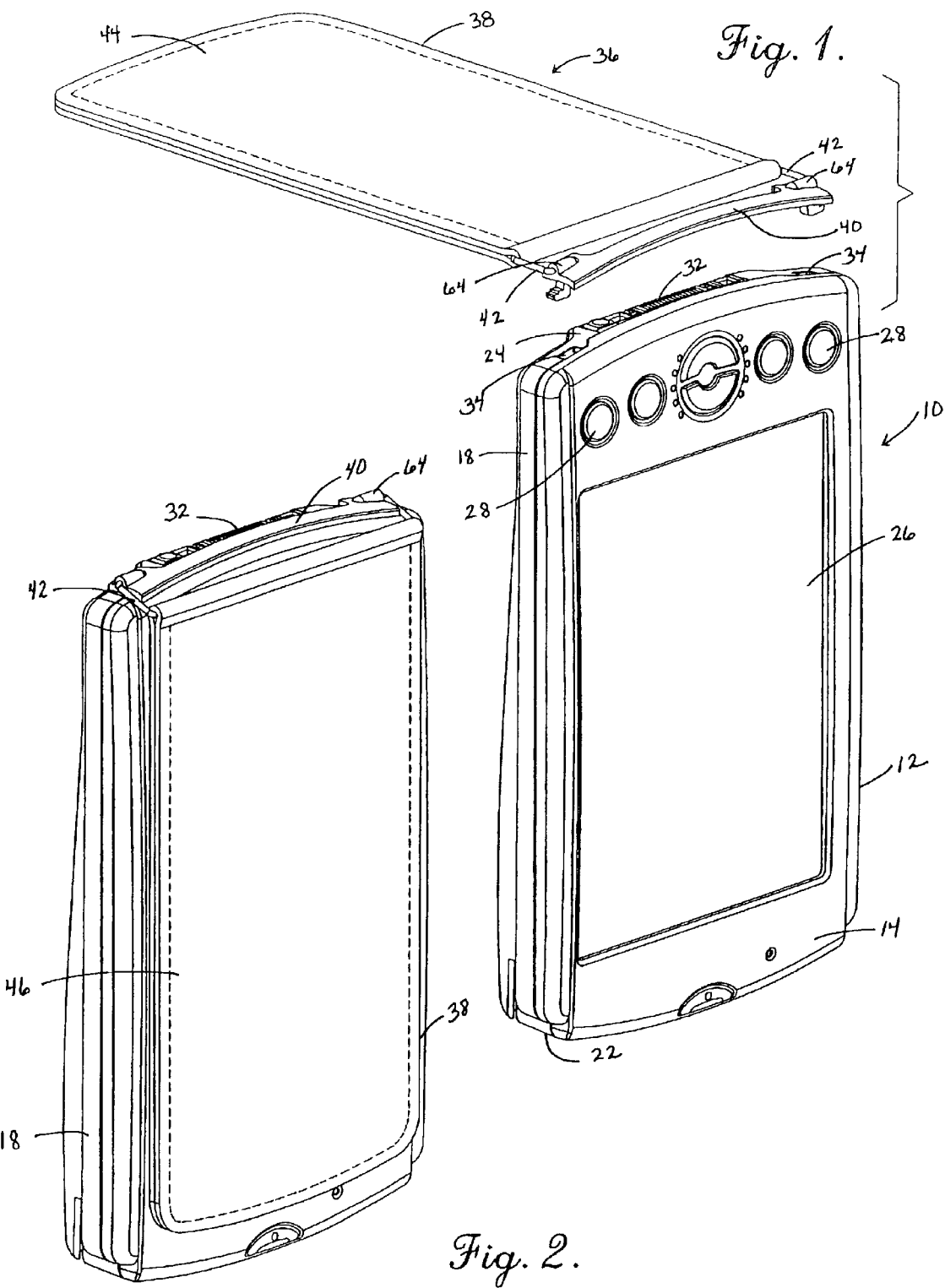
FIG. 1 is a perspective view of a protective cover assembly according to the present invention shown detached from, but in positional relation to, an electronic device.
FIG. 2 is a perspective view showing a protective cover assembly according to the present invention pivotally coupled with an electronic device in a closed, or protective, position.

Referring to the figures in general, and initially to FIGS. 1 and 5 in particular, an exemplary electronic device which may be used with a protective cover assembly of the present invention is illustrated and denoted generally by reference numeral 10. The illustrated electronic device is in the form of a Personal Digital Assistant (PDA) although it will be understood and appreciated by those of ordinary skill in the art that the protective cover assembly of the present invention may be utilized with many other electronic devices, including, but not limited to, cellular telephones and the like. The illustrated electronic device 10 includes a housing 12 which is comprised of a top surface 14, a bottom surface 16, first and second longitudinal side surfaces 18, 20 and first and second end surfaces 22, 24. The top surface 14 includes an opening therein which houses a display screen 26, the display screen 26 typically being slightly recessed from the plane of the top surface 14. The top surface 14 also includes at least one button or control 28 positioned outside of the display screen 26, typically proximate either the first end surface 22 or the second end surface 24. It will be understood by those of ordinary skill in the art that the at least one control 28 may alternatively be positioned on the top surface 14 proximate one or both of the first and second longitudinal side surface(s) 18, 20 or directly on the side surface(s) 18, 20 or end surface(s) 22, 24 themselves. Such variations are contemplated to be within the scope of the present invention.

The electronic device 10 also includes a communications region 32 on the second end surface 24 thereof as well as a recessed engagement feature comprised of a pair of recesses 34. The communications region 32 typically includes a communications port for communication with an external device (not shown) through a cable, infrared light beam, or the like, and is positioned approximately centrally between the first and second longitudinal side surfaces 18, 20, as well as slightly off center toward the bottom surface 16 of the electronic device 10. The recesses 34 are sized and shaped for receiving connection or alignment posts on a storage cradle or the like and are positioned proximate the first and second longitudinal side surfaces 18, 20, respectively, and approximately centrally between the top surface 14 and the bottom surface 16 of the electronic device 10.

Illustrated in FIG. 1 in positional relationship to the electronic device 10 is a cover assembly 36 according to the present invention. The cover assembly 36 includes a substantially planar cover portion 38 and a flexible bridge member 40 coupled with one another about two spaced parallel pivot points by a pair of brackets 42, which may be formed of metal wire, at or near respective ends thereof. The brackets 42, as illustrated, may comprise wire members formed of end portions of a unitary piece of wire extending through a bight 48 formed by overlapped material of the substantially planar cover portion 38 or, alternatively, may comprise two separate wire members having end portions gripped within bight 48 and formed to prevent withdrawal thereof. The substantially planar cover portion 38 may be formed of any suitable sheet material, e.g., leather or vinyl, and includes first and second substantially planar surfaces 44, 46 formed by folding an elongate piece of sheet material over onto itself and stitching along the peripheral edge thereof (as shown in dotted line in FIG. 1). Alternative methods of securing the first and second substantially planar surfaces 44, 46 to one another may also be employed in place of stitching, if desired. Such alternatives include, but are not limited to, stapling, adhesive bonding, heat bonding and the like. Such folding creates a bight 48 defining an elongated aperture therethrough. Brackets 42, as illustrated, may lie at opposing ends of an elongated mid-portion of an elongated wire, brackets 42 comprising end portions of the wire bent substantially perpendicularly to the mid-portion and lying at a sufficient mutual distance to enable the sheet material to be folded thereover to define the bight 48 and be mutually secured to form the substantially planar cover portion 38. The free ends of the wire, lying at each end of the mid-portion and outboard of the first perpendicular bend, are also bent inwardly perpendicularly toward each other and in mutual coaxial alignment. Alternatively, if brackets 42 comprise separate wire members, they may be appropriately positioned and the sheet material of the substantially planar cover portion 38 folded over the aligned ends.

It will be understood and appreciated by those of ordinary skill in the art that the material of the substantially planar cover portion 38 need not necessarily fold entirely over itself as shown, but may employ a smaller fold area, if desired, so long as the fold area is sufficient to form the bight 48. Alternatively, the first and second planar surfaces 44, 46 of the substantially planar cover portion 38 may be formed of two separate pieces of material stitched, or otherwise secured, to one another in such a way as to create a bight 48 having an aperture therethrough for securing the brackets 42 to the substantially planar cover portion 38. Such variations are contemplated to be within the scope of the present invention.

As best seen in FIG. 3, the flexible bridge member 40 includes an elongated member 50 having first and second longitudinal side edges 52, 54 thereof. Elongated member 50 may comprise, for example, injection molded plastic. The first longitudinal side edge 52 is substantially planar, being slightly arcuate or bowed in configuration, while the second longitudinal side edge 54 includes a substantially centrally located elongated cut-out or recessed region 56 located and configured to permit access to the communications region 32 when the cover assembly 36 is assembled with the electronic device 10, as more fully described below, and which also provides flexibility to the elongated member 50 to facilitate bowing or bending under compressive force applied to the ends thereof. It will be understood and appreciated by those of ordinary skill in the art that if such access to the communications region 32 is not desired, if the electronic device 10 with which the cover assembly 36 is being assembled does not include a communications region 32, or if the communications region 32 of the electronic device 10 is positioned other than on the end surface which also contains the recesses 34, the cut-out or recessed region 56 may be eliminated.

The elongated member 50 of flexible bridge member 40 further includes a protruding engagement feature comprised of a pair of posts 58 extending from the same side and at opposing ends thereof. Each post 58 includes a body portion 60 extending substantially transverse to the elongated member 50 and a foot portion 62 extending substantially transverse to the body portion 60 and facing outwardly toward the adjacent end of the elongated member 50. The foot portion 62 of each post 58 may protrude outwardly from the body portion 60 at an angle with respect thereto of less than 180°. It is currently preferred that the foot portion 62 of each post 58 protrudes from the body portion 60 thereof at an angle of approximately 90°.

As best seen in FIG. 1, protruding from the elongated member 50, in a direction opposite that of the posts 58, is a pair of raised regions 64 having apertures 66 extending thereinto from outer ends thereof for receiving a free end of each bracket 42, as more fully described below.

The substantially planar cover portion 38 and the flexible bridge member 40 may be coupled with one another about the aforementioned two spaced, parallel pivot points provided by the brackets 42 (FIGS. 1 and 5) to form the cover assembly 36 of the present invention. The free ends of the brackets 42 are inserted into the respective apertures 66 in the raised regions 64 of the flexible bridge member 40. Due to the previously described configuration of the wire of which brackets 42 form a part, upon insertion of the free ends thereof into the apertures 66 in the raised regions 64, a dual-hinge, pivotal relationship is created. Stated differently, the planar cover portion 38 is permitted to pivot about the first end of each bracket 42 in alignment with the mid-portion of the wire extending through the bight 48 (or the ends of the brackets 42 inserted therein) and the flexible bridge member 40 is permitted to pivot about the free end of each bracket 42. Both the bight 48 of the apertures 66 in the raised regions 64 of the flexible bridge member 40 are sized and shaped to permit the respective ends of the brackets 42 to fit securely, although freely from a rotational standpoint, therein.

It will be understood and appreciated by those of ordinary skill in the art that alternative coupling mechanisms, such as hinges and the like, may be utilized rather than brackets to pivotally couple the substantially planar cover portion 38 with the flexible bridge member 40. As another example, the sheet materials of the substantially planar cover portion 38 may be laminated over a flexible sheet secured to the flexible bridge member 40, or the flexible bridge member 40 may be molded to include such a flexible portion to permit rotation of the substantially planar cover portion 38 with respect to the elongated member 50.

Figure 7:
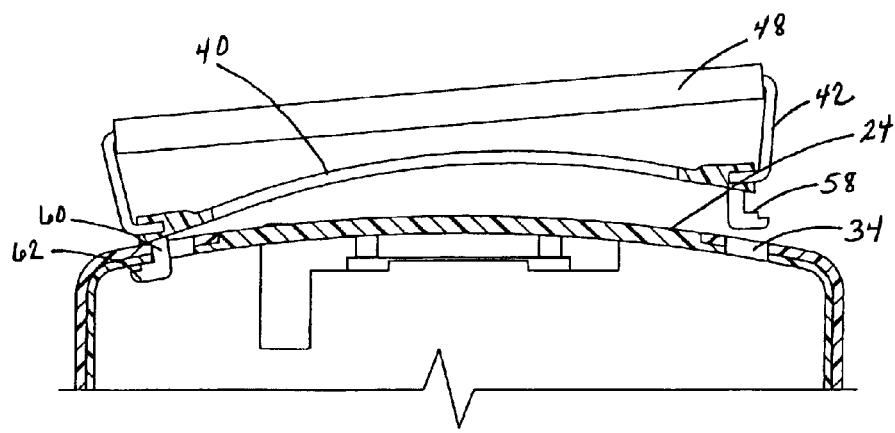
FIG. 7 is a cross-sectional view of the electronic device of FIG. 6 taken in the direction of the arrows and showing the coupling of the flexible bridge member to an end surface of the electronic device.
Figure 8:
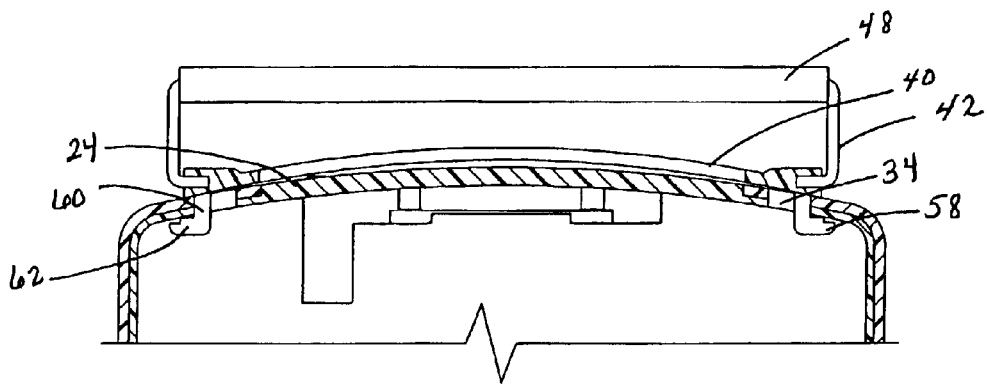
FIG. 8 is a cross-sectional view similar to the view of FIG. 7 showing the flexible bridge member coupled with a surface of the housing of the electronic device.

The cover assembly 36 may be assembled with the electronic device 10 as shown in FIGS. 7 and 8. Due to the flexible nature of the bridge member 40, upon biasing the flexible bridge member 40 inward from the ends thereof, the body portion 60 of the posts 58 may be inserted into the recesses 34 on the second end surface 24 of the electronic device 10. To cause this inward bias, an inward force may be applied to the lateral ends of the flexible bridge member 40 toward one another causing the central region of the flexible bridge member 40 to bow outwardly. This inward force may be most easily applied by a user's finger and thumb placing an inward force on the brackets 42. While inward force is maintained, the foot portion 62 of one of the posts 58 may be inserted into one of the respective recesses 34 in the second end surface 24 of the electronic device 10 and the foot portion 62 of the other post 58 placed in alignment with the other recess 34. Upon release of the inward force, the flexible bridge member 40 flexes outwardly. This causes the body portions 60 of the posts 58 to press against the outer-most portion of the respective, adjacent and aligned recess 34, thus securely coupling the respective ends of the flexible bridge member 40 with the electronic device 10, as shown in FIG. 7. Upon release of all inward force on the flexible bridge member 40, the bridge member 40 may be securely coupled with the electronic device, separation thereof permitted only upon application of inward force on the bridge member 40 to release the posts 58 from the recesses 34.

Figure 6:
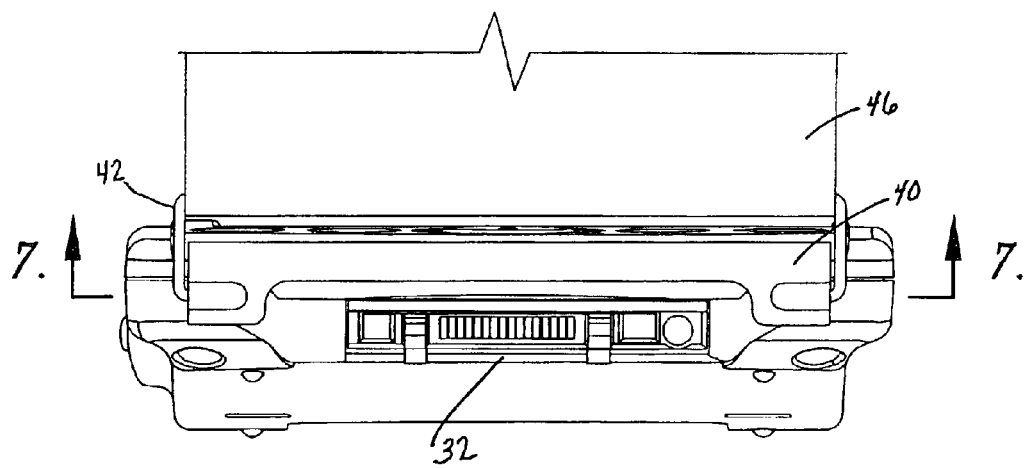
FIG. 6 is a perspective view of an end of an electronic device having a protective cover assembly according to the present invention coupled therewith, wherein the substantially planar cover portion of the protective cover assembly is positioned between its protective and exposed positions.

It is currently preferred that, if the electronic device 10 with which the cover assembly 36 of the present invention is being assembled includes a communications region 32, the flexible bridge member 40 is coupled with the electronic device 10 in an orientation which permits access to the communications region 32 through the elongated recessed region 56 of the flexible bridge member 40 while the cover assembly 36 is coupled with the electronic device 10. Such coupling orientation is best seen in FIG. 6.

When in a closed or protective position, the substantially planar cover portion 38 is positioned to substantially cover the display screen 26 and, if desired, the at least one control 28 on the top surface 14 of the electronic device 10. In this position, the second planar surface 46 of the substantially planar cover portion 38 is visible, as shown in FIG. 2, while the first planar surface 44 is positioned proximate the top surface 14. Once assembled with the electronic device 10, the substantially planar cover portion 38 may pivot about the mid-portion of the wire from which the wire brackets 42 are formed (or the aligned ends of the brackets 42) and the flexible bridge member 40 may pivot about the free ends of the wire brackets 42. Thus, to move the substantially planar cover portion 38 from the closed or protective position to an open or exposed position, the cover portion 38 and the flexible bridge member 40 may be pivoted about each respective, offset pivot point such that the substantially planar cover portion is moved away from the top surface 14 of the electronic device 10 and toward the bottom surface 16 thereof. In a completely open or exposed position, the substantially planar cover portion 38 is positioned proximate the bottom surface 16 of the electronic device 10 and the first planar surface 44 of the cover portion 38 is visible. It should be noted that the dual-pivot configuration of the present invention permits the substantially planar cover portion 38 to lie substantially flush with the bottom surface 16 of the electronic device 10. In this position, a user may utilize the electronic device 10 as desired. When finished using the device 10, the user may pivot the substantially planar cover portion 38 back into its closed or protective position wherein the display screen 26 and, if desired, at least one control 30 are substantially protected from damage. Respective open and closed positions of the substantially planar cover portion 38 are shown in FIG. 5 and an orientation of the substantially planar cover portion 38 between the open and closed positions is shown in FIGS. 4 and 6.

In another embodiment, the protective cover assembly of the present invention may be formed of a single piece of material, e.g., molded plastic. In this embodiment, the single piece of material comprises three portions: a relatively rigid, substantially planar cover portion, a relatively rigid bridge member portion configured to be coupled with an electronic device and a relatively flexible connecting portion located between the substantially planar cover portion and the bridge member portion. The flexible connecting portion is flexible enough to permit the aforementioned spatially offset rotation of the substantially planar cover portion with respect to the bridge member between open and closed positions as previously described. If desired, locking mechanisms may be cooperatively located on the top and bottom surfaces of the electronic device and on opposing planar surfaces of the substantially planar cover portion to secure the substantially planar cover portion in its respective open and closed positions.

The protective cover assembly 36 of the present invention provides a lightweight, low profile cover which may be utilized with a wide variety of existing electronic devices. The protective cover assembly 36 of the present invention also permits simple assembly and disassembly and protects the display screen and/or user controls of an electronic device from damage when such device is not in use.

While the cover assembly 36 of the present invention has been disclosed herein in terms of an exemplary embodiment and variations thereof, those of ordinary skill in the art will recognize and appreciate that many other additions, deletions, and modifications to the disclosed embodiments may be effected without departing from the scope of the invention as hereinafter claimed. For instance, many suitable variations of electronic devices and pivotal coupling mechanisms may be utilized within the scope of the invention. Such variations are contemplated to be within the scope hereof.

Having thus described the invention, what is claimed is:

1. A protective cover assembly for a portable electronic device, the protective cover assembly comprising:
   a substantially planar cover portion, wherein the substantially planar cover portion is formed of a single piece of material folded over itself to form a bight at one end thereof; and
   a flexible bridge member pivotally coupled with the substantially planar cover portion for spatially offset rotation of the substantially planar cover portion with respect thereto, the flexible bridge member configured for direct engagement with the electronic device,
   wherein the flexible bridge member is pivotally coupled for the spatially offset rotation about a first of two spaced pivot points with the substantially planar cover portion by pivotal engagement of the substantially planar cover portion with wire members configured as brackets at opposing ends thereof, the bight of the substantially planar cover portion receiving ends of the wire members.

2. A protective cover assembly for a portable electronic device having a display screen, the protective cover assembly rotatable between an open position and a closed position, the protective cover assembly comprising:
   a substantially planar cover portion configured to cover the display screen of the portable electronic device when the protective cover assembly is in the closed position, wherein the substantially planar cover portion is formed of a single piece of material folded over itself to form a bight at one end thereof; and
   a flexible bridge member pivotally coupled about two spaced pivot points with the substantially planar cover portion, the flexible bridge member configured for direct engagement with the electronic device,
   wherein the flexible bridge member is pivotally coupled about a first of the two spaced pivot points with the substantially planar cover portion by pivotal engagement of the substantially planar cover portion with wire members configured as brackets at opposing ends thereof, the bight of the substantially planar cover portion receiving ends of the wire members.

3. A portable electronic device, comprising:
   a housing including a top surface, a bottom surface and a plurality of surfaces, wherein at least one of the plurality of surfaces includes a pair of recesses therein; and
   a protective cover assembly rotatable between a first position and a second position, the protective cover assembly comprising:
      a substantially planar cover portion, configured to be positioned proximate the top surface when the protective cover assembly is in the first position and proximate the bottom surface when the protective cover assembly is in the second position, wherein the substantially planar cover portion is formed of a single piece of material folded over itself to form a bight at one end thereof; and
      a flexible bridge member pivotally coupled about two spaced pivot points with the substantially planar cover portion, the flexible bridge member including a pair of posts protruding therefrom engaged in the pair of recesses of the housing,
      wherein the flexible bridge member is pivotally coupled about a first of the two spaced pivot points with the substantially planar cover portion by pivotal engagement of the substantially planar cover portion with wire members configured as brackets at opposing ends thereof, the bight of the substantially planar cover portion receiving the ends of the wire members.

* * * * *